CORE MEMORY CIRCUIT

Filed June 11, 1962

INVENTOR
ARTHUR J. RADCLIFFE, JR.
BY Hurvitz & Rose
ATTORNEYS

United States Patent Office 3,327,296
Patented June 20, 1967

3,327,296
CORE MEMORY CIRCUIT
Arthur J. Radcliffe, Jr., Orlando, Fla., assignor to Radiation, Inc., Melbourne, Fla., a corporation of Florida
Filed June 11, 1962, Ser. No. 201,505
10 Claims. (Cl. 340—174)

Figures 1, 2:
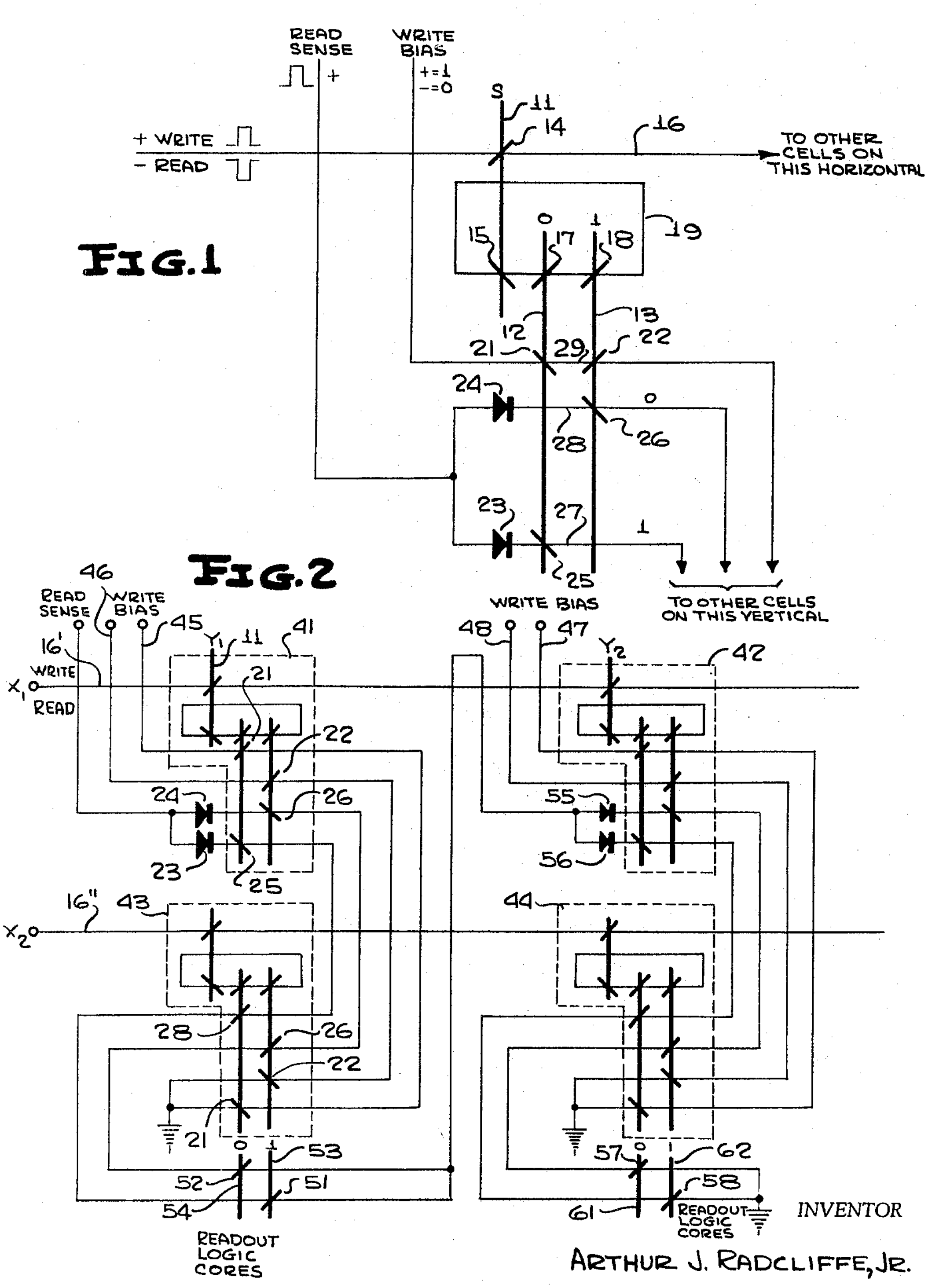

The present invention relates generally to magnetic core circuitry and more particularly to a magnetic current steering circuit requiring only magnetic drivers.

Presently available magnetic steering circuits utilized in conjunction with core memories utilize active elements, e.g. transistors, for strobe networks as well as for sensing and driver amplifiers. In comparison with magnetic cores, transistors are unreliable and have short periods of successful operation. Cores are capable of operating accurately over considerably wider temperature ranges than transistors because of their smaller temperature coefficients. Also, magnetic elements can tolerate an order of magnitude more nuclear radiation than transistors, a requirement frequently found necessary for systems utilized in space vehicles.

In core memory systems utilizing transistors, difficult interface problems arise because of the mismatch between the core output impedance and the transistor input impedance.

The present invention obviates the need for transistor driving circuits by utilizing a pair of rectangular hysteresis loop magnetic memory cores, one of which is selectively driven to a state of saturation of opposite polarity to that of its initial saturation state while the other is left in the initial saturation state, or vice versa, depending upon the relative polarities of a pair of pulses simultaneously applied to a pair of input windings on each core. A bias pulse is applied to corresponding ones of the pair of input windings of each core as both cores are driven toward the same state by a current pulse applied to the others of the pair of input windings, the latter pulse being derived from a specified change in state of a switching core in response to an input pulse. The output winding of the switching core is connected in series with an input winding of each memory core. Since it is necessary for both the bias and current pulses to be applied to the pair of input windings of each memory core at the same time to achieve a change in saturation level, only one of the memory cores is switched from its initial saturation state to the opposite polarity saturation state at a time. That is, the input windings of each core are wound in such a manner that a pair of pulses of corresponding polarity applied to each pair of windings will result in a cancellation of magnetization forces derived therefrom in one core, with a consequent retention of its initial saturation state, while the magnetization forces in the other core are aiding to produce a reversal in saturating flux, with a consequent change in its state of saturation. If the applied pulses are of opposite polarity, the converse will occur.

Connected between the source of pulses to be steered and the output windings of each memory core, is a diode poled to normally pass the steered pulses. At the same time that a current pulse to be steered is applied to the diodes, an input is applied to the switch core so that the memory core which had immediately prior thereto undergone a change in state is re-set to its initial state. Since the other of the cores is already in this condition, it does not now develop a back E.M.F. across its output winding. The voltage developed in the output winding of the re-set core, however, back biases the diode to which it is connected. Thereby, the flow of current from the source is steered through the diode coupled to the core which was not set by the information pulse. This circuit is utilized to great advantage in memory core arrays which feed magnetic logic networks since it needs no transistors.

It is an object of the present invention to provide a new and improved current steering network.

Another object of the present invention is to provide a current steering network which does not require active elements, such as transistors, when used in a core matrix.

A further object of the present invention is to provide a new and improved current steering network in which a pair of cores are initially set to a predetermined state by the magnetic forces established therein in response to the change in saturation level of another core.

An additional object of the present invention is to provide a current steering circuit in which a pair of cores storing oppositely polarized saturation levels are set at the same state simultaneously with the application of the steered current to switches coupled to the cores.

Yet another object of the invention is to provide a current steering circuit which is reliable for binary signals having levels which differ from each other by as much as 50%.

A still further object of the present invention is to provide a current steering circuit which functions properly in widely varying temperature and radiation environments.

Yet an additional object of the invention is to provide a magnetic core current steering network in which problems associated with impedance mismatch are obviated.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram of a preferred embodiment of the present invention; and FIGURE 2 is a circuit diagram illustrating the manner in which the invention is utilized in a core matrix.

Reference is now made to FIGURE 1 of the drawings which disclosed three magnetic core 11, 12, and 13 having substantially rectangular hysteresis loops. Cores 11, 12, and 13 and their windings are represented by the mirror symbol so that the application of a positive pulse to input winding 14 from the left direction sets core 11 in a positive saturation state. This results in a positive voltage being derived from output winding 15 and a positive current flow from it in the right direction. Opposite results occur when a negative pulse is coupled to winding 14 or when the input and output windings are oppositely orientated, as indicated by the direction of the lines associated therewith.

Connected to the input winding 14 is lead 16 which is responsive to successively occurring positive "write" pulses and negative "read" pulses. Lead 16 couples the read and write signals to a plurality of other switch cores (not shown) which are horizontally aligned in the memory matrix with core 11. Winding 15 is connected to the input windings 17 and 18 of cores 12 and 13, respectively, by lead 19. Lead 19 couples the changes in state of core 11 to cores 12 and 13 by single turn windings 17 and 18 so that switching of cores 12 and 13 is in the flux limited mode.

The oppositely wound input windings 21 and 22 of cores 12 and 13 are connected via lead 29 to write bias or information signal pulses which are generated simultaneously with the write pulse on lead 16. The write bias pulses are positive for binary one signals and negative for binary zeros. The positive current pulse to be steered is applied to the anodes of diodes 23 and 24 simultaneously with the negative read pulse on lead 16. The cathodes of diodes 23 and 24 are connected to output windings 25 and 26 of cores 12 and 13, via leads 27 and 28 respectively.

Leads 27, 28 and 29 are connected to corresponding windings in similar cores which are vertically aligned in the core matrix with cores 11, 12, and 13 in a manner described in conjunction with FIGURE 2.

In operation, a positive write pulse is initially applied to set switch core 11 in a positive, binary one, flux state. The change of flux in core 11 drives cores 12 and 13 towards a binary one saturation state due to the connection between windings 15, 17 and 18. Simultaneously with the occurrence of the write pulse, a positive or negative information signal is coupled to windings 21 and 22. Switching of the selected core results because the net aiding ampere turns supplied by both input windings simultaneously is sufficient to drive the core to positive saturation. However, in the other core the input ampere turns buck and no change of state results. The single turn linking switch core 11 to memory cores 12 and 13 permits only as much total flux to be switched in the memory core as is present in the switch core. This permits current variations of up to ±50% in the bias pulses since the switch core contributes a sizeable amount of the coercive force necessary for switching.

When the information signal is positive, core 12 is left in negative saturation since the magnetic forces established by windings 17 and 21 cancel. However, the magnetic forces established by windings 18 and 22 aid so that core 13 is positively saturated.

Subsequent to cores 12 and 13 being set by the information signal, a negative read pulse is generated on lead 16 at the same time that a positive sensing pulse is applied to the anodes of diodes 23 and 24. The read pulse resets core 11 to the zero saturation state. This causes positively saturated memory core 13 to change state while core 12 remains negatively saturated.

Switching of core 13 generates a positive back E.M.F. across winding 26 which blocks conduction through switching diode 24. Since no appreciable change in the flux level of core 12 results, there is no blocking voltage applied to diode 23 and it passes the positive read pulse to lead 27. In the same manner a negative information or write bias pulse causes core 13 to be set in the zero state and core 12 in the one state so that the read sense pulse is coupled through diode 24 and blocked by diode 23.

Reference is now made to FIGURE 2 of the drawings which illustrates the manner in which the circuit of FIGURE 1 is utilized in a 2 x 2 memory matrix. The matrix includes four cells 41, 42, 43, and 44, each of which includes three cores 11, 12, and 13. Memory cores 12 and 13 in each cell are coupled to each other and to switching core 11 in the same manner described in conjunction with FIGURE 1.

Input windings 21 and 22 of cores 12 and 13 in cells 41 and 43 are connected in separate series circuits to bias signal sources via leads 45 and 46. The input windings 21 and 22 of cells 42 and 44 are connected in another pair of series circuits to separate sources of positive bias signals via leads 47 and 48. Windings 21 and 22, instead of being connected to a single lead, are connected to separate leads 45 and 46 because of the relative convenience of using bias signals of a single polarity. In FIGURE 2, windings 21 and 22 are wound in the same direction on cores 12 and 13 so that the positive write bias pulses set both cores at the same saturation level. One of the write bias pulses is applied to leads 45 and 46 at the same relative operation sequence time as the write bias pulses are applied in FIGURE 1.

The switch core input windings 14 of cells 41 and 42 are responsive to the positive "write" pulses and negative "read" pulses applied to lead 16′. Similarly, windings 14 of cells 43 and 44 are simultaneously responsive to the read and write signals on lead 16″. The output windings of cores 12 and 13 in cell 41 are connected to the read sense signal source via diodes 23 and 24. These windings are connected in separate series circuits with the corresponding windings in cell 43 and the input windings 51 and 52 of readout logic cores 53 and 54. The other side of windings 51 and 52 are connected together and to the anodes of diodes 55 and 56 which are coupled to the output windings 26 and 25 of cores 12 and 13 in cell 42. Windings 25 and 26 of cells 42 and 44 are connected in separate series circuits to the input windings 57 and 58 of readout cores 61 and 62. Cores 53, 54, 61, and 62 are responsive to the matrix outputs in such a manner as to perform Boolean logic functions in a known manner.

To describe the operation of the matrix of FIGURE 2, it is assumed that a positive write pulse is applied to lead 16′ and a positive bias pulse is applied to lead 45. This causes core 12 of cell 41 to be driven to positive saturation while each of the other cores is maintained at negative saturation. This results from the inability of the ampere turns supplied to the other cores by a single source to change the saturation state. When the read and read sense pulses are simultaneously generated, the output windings of core 12 in cell 41 generates a voltage to block current flow through diode 23 while current flows through diode 24 to winding 52.

The current flowing through diode 24 is split in two substantially equal segments when it reaches diodes 55 and 56 since there is no back E.M.F. generated by the output windings of the memory cores in cells 42 and 44. Hence, the current flow to input windings 57 and 58 is insufficient to trigger cores 61 and 62 since these cores require a greater ampere turn input than that produced by one half of the read sense pulse.

For larger capacity memories, the matrix of FIGURE 2 is easily extended to an $M \times N$ size, where M and N are any integers, by merely providing $M \times N$ cells, M horizontal, and N vertical inputs.

While I have described and illustrated one specific embodiment of my invention, it will be clear that variations of the details of construction which are specifically illustrated and described may be restored to without departing from the true spirit and scope of the invention as defined in the appended claims.

I claim:

1. A current steering circuit comprising a pair of magnetic cores, each of said cores having a substantially rectangular hysteresis loop, whereby said cores are capable of assuming binary storage states, magnetic switching means for driving each of said cores from the same initial state toward an opposite state, means for selectively aiding and opposing said driving by said switching means to permit only one of said pair of cores to reach said opposite state while maintaining the other of said cores in said initial state, a pair of switch means respectively coupled to each of said cores, each of said switch means responsive to application of signals thereto for passage of said signals therethrough and further responsive to a change in state of its associated core from said opposite state to said initial state to block the passage of said signals, and means for resetting said one of said cores to said initial state simultaneously with the application of said signals to said pair of switch means, so that said signals are passed only by the switch means associated with said other of said cores.

2. The circuit of claim 1 wherein said magnetic switching means includes a further magnetic core having a substantially rectangular hysteresis loop, said pair of cores and said another core each having a respective input winding and output winding, means connecting the output winding of said another core to the input winding of each of said pair of cores, said another core responsive to the application of signal to the input winding thereof; said means for selectively aiding and opposing said driving including a further input winding on each of said pair of cores, and means connecting said further input windings for simultaneous application of signal thereto.

3. The circuit of claim 2 wherein said pair of switch means include an input pulse terminal, and a pair of similarly poled diodes respectively coupled between the output winding of each of said pair of cores and said terminal.

4. A current steering circuit, comprising a magnetic switching core, a pair of magnetic memory cores, each of said cores being capable of assuming binary set and reset states, each of said cores including an input winding and an output winding, said memory cores each being in the same initial state and further including another input winding, means coupling said switching core output winding to each of said first-named memory core input windings, means for applying a signal to said switching core input winding to induce a switching signal in said switching core output winding and thereby in each of said first-named memory core input windings, means for selectively applying a further signal to said another input winding of each of said memory cores to aid the flux created by the switching signal in one of said memory cores and to oppose the flux created by the switching signal in the other of said memory cores, to thereby drive said one memory core to one of said binary states opposite to said initial state and to retain said other memory core in said initial state, a pair of gate means coupled respectively to each of said memory core output windings, means for applying signal current to said pair of gate means, each of said gate means being responsive to pass said signal current applied thereto in the absence of a biasing signal induced in the output winding of its associated memory core, and means for restoring said one memory core to said initial state to induce a biasing signal in the output winding thereof, so that said current is steered through the gate means associated with said other memory core.

5. A current steering circuit for a magnetic memory system, comprising a pair of bistable magnetic devices, each capable of assuming one or the other of two stable states, each of said devices being initially in said one stable state; means for selectively driving only one of said devices into said other stable state; a pair of switch means each coupled to a separate load circuit via a respective one of said magnetic devices, each of said switch means having conductive and non-conductive states and each being responsive to signals applied thereto to assume said conductive state, each of said switch means further responsive to a change in state of the magnetic device to which it is coupled, from said other state to said one state, to assume said non-conductive state; means for applying the same signals to both said switch means, and means for simultaneously therewith restoring said one of said magnetic devices to said one stable state, said same signals thereby transmitted only to the load circuit coupled to that one of said switch means associated with the other of said magnetic devices.

6. The combination according to claim 5 wherein said means for selectively driving includes a further bistable magnetic device coupled to said pair of magnetic devices, said further magnetic device being responsive to pulses of one polarity applied thereto to drive each of said pair of bistable devices toward said other stable state, and responsive to applied pulses of polarity opposite to said one polarity to restore each of said pair of magnetic devices then in said other stable state to said one stable state; said pair of magnetic devices including means responsive to bias pulses applied thereto simultaneously with said driving toward said other stable state for completion of driving said one magnetic device into said other stable state while returning said other magnetic device to said initial state prior to its reaching said other stable state.

7. The combination according to the claim 6 wherein each of said pair of magnetic devices includes a magnetic core having a substantially rectangular hysteresis loop and capable of assuming set and re-set states corresponding to said other and to said one stable states respectively, each core having first and second input windings and an output winding, said second input winding being included in said means for completion of driving, the first and second input windings of one of said cores being responsive only to the simultaneous application thereto of opposite polarity pulses to drive that core into said set state, the first and second input windings of the other of said cores being responsive only to the simultaneous application thereto of pulses of the same polarity to drive that core into said set state; means for transferring pulses derived from said pulses applied to said further magnetic device simultaneously to said first input winding of each of said cores, and means for applying pulses of preselected polarity simultantously to said second input winding of each of said cores, concurrently with said transferring of pulses, to produce said selective driving of said magnetic devices.

8. The combination according to claim 7 wherein said further bistable magnetic device includes a magnetic core having an input winding and an output winding, so that pulses are derived at said last-named output winding from pulses applied to said last-named input winding; said means for transferring said derived pulses including means coupling said last-named output winding to said first input winding of each of said pair of cores.

9. The combination according to claim 8 wherein said pair of switch means comprises a pair of normally unbiased diodes, said pair of diodes being responsive to applied signal pulses of only one polarity to pass those pulses to said respective load circuits, each of said diodes having an input electrode to which said signal pulses are applied to an output electrode, the output electrode of each of said diodes being coupled to a respective output winding of said pair of cores, each of said respective output windings being responsive to change in state of its respective core, from set to re-set, to provide blocking bias on the diode coupled thereto, so that said signal pulses of one polarity applied to said diodes simultaneously with said change in state of one of said pair of cores are passed only by the diode associated with the other of said pair of cores.

10. A magnetic core matrix comprising $M \times N$ memory cells, said cells being arranged in a matrix having M rows and N columns, each of said cells including: a pair of memory cores and a switching core, each of said cores having a substantially rectangular hysteresis loop, means for coupling changes in state of said switching core to enable said pair of memory cores to switch state; means for simultaneously coupling a bias signal to a selected one of the memory cores of each of said pairs in the $I^{th}$ column and for changing the state of each switching core in the $L^{th}$ row, whereby the selected memory core in the $I^{th}$ column and the $L^{th}$ row changes state, where I is any integer between 1 and N, L is any integer between 1 and M, a source of read sensing pulses, a pair of diodes, each of said diodes connected in separate series circuits with an output winding of one of said memory cores in said $I^{th}$ column; said diodes being connected to normally pass said pulses, and means for resetting the state of each switching core in the $L^{th}$ row simultaneously with the occurrence of said read sensing pulses, said switching core generating a signal of sufficient amplitude when reset to change the state of said selected core, whereby the diode connected in series with said selected core is blocked.

References Cited

UNITED STATES PATENTS

| | | | |
|---|---|---|---|
| 3,056,040 | 9/1962 | Markowitz | 307—88 |
| 3,085,162 | 4/1963 | Warman | 307—88 |

BERNARD KONICK, *Primary Examiner.*

IRVING L. SRAGOW, H. D. VOLK, M. S. GITTES, *Assistant Examiners.*